United States Patent
Aghamohammadi et al.

(10) Patent No.: US 10,093,021 B2
(45) Date of Patent: Oct. 9, 2018

(54) SIMULTANEOUS MAPPING AND PLANNING BY A ROBOT

(71) Applicant: QUALCOMM Incorporated, San Diego, CA (US)

(72) Inventors: Aliakbar Aghamohammadi, San Diego, CA (US); Serafin Diaz Spindola, San Diego, CA (US); Bardia Fallah Behabadi, San Diego, CA (US); Christopher Lott, San Diego, CA (US); Shayegan Omidshafiei, Boston, MA (US); Kiran Somasundaram, San Diego, CA (US); Sarah Paige Gibson, Del Mar, CA (US); Casimir Matthew Wierzynski, La Jolla, CA (US); Saurav Agarwal, College Station, TX (US); Gerhard Reitmayr, Vienna (AT)

(73) Assignee: QUALCOMM Incorporated, San Diego, CA (US)

(*) Notice: Subject to any disclaimer, the term of this patent is extended or adjusted under 35 U.S.C. 154(b) by 221 days.

(21) Appl. No.: 15/192,719

(22) Filed: Jun. 24, 2016

(65) Prior Publication Data

US 2017/0157769 A1 Jun. 8, 2017

Related U.S. Application Data

(60) Provisional application No. 62/262,275, filed on Dec. 2, 2015.

(51) Int. Cl.
*B25J 9/16* (2006.01)
*G05D 1/02* (2006.01)
(Continued)

(52) U.S. Cl.
CPC ............ *B25J 9/1664* (2013.01); *G01C 21/20* (2013.01); *G01C 21/32* (2013.01); *G05D 1/0217* (2013.01);
(Continued)

(58) Field of Classification Search
CPC .... B25J 9/1664–9/1666; G05D 1/0221; G05D 1/0274; G05B 2219/40512;
(Continued)

(56) References Cited

U.S. PATENT DOCUMENTS

| 5,111,401 A | 5/1992 | Everett, Jr. et al. |
| 7,912,583 B2 * | 3/2011 | Gutmann ................ G06T 7/593 700/245 |

(Continued)

OTHER PUBLICATIONS

Agha-Mohammadi A., et al., "Robust Online Belief Space Planning in Changing Environments: Application to Physical Mobile Robots", 2014, IEEE International Conference on Robotics and Automation (ICRA), IEEE, May 31, 2014, XP032650763, pp. 149-156.
(Continued)

*Primary Examiner* — Bao Long T Nguyen
(74) *Attorney, Agent, or Firm* — Seyfarth Shaw LLP

(57) ABSTRACT

A method substantially simultaneously plans a path and maps an environment by a robot. The method determines a mean of an occupancy level for a location in a map. The method also includes determining a probability distribution function (PDF) of the occupancy level. The method further includes calculating a cost function based on the PDF. Finally, the method includes simultaneously planning the path and mapping the environment based on the cost function.

20 Claims, 16 Drawing Sheets

(51) Int. Cl.
*G01C 21/20* (2006.01)
*G01C 21/32* (2006.01)

(52) U.S. Cl.
CPC . *G05D 1/0274* (2013.01); *G05B 2219/40512* (2013.01); *G05B 2219/40519* (2013.01); *G05D 1/0251* (2013.01); *Y10S 901/01* (2013.01)

(58) Field of Classification Search
CPC .......... G05B 2219/40519; G05B 2219/40442; G06F 15/30; Y10S 901/01
USPC ............. 700/245, 250, 253, 255, 258; 901/1
See application file for complete search history.

(56) References Cited

U.S. PATENT DOCUMENTS

| | | | | |
|---|---|---|---|---|
| 8,280,574 | B2* | 10/2012 | Yabushita | G06Q 10/047 700/253 |
| 2011/0098874 | A1* | 4/2011 | Choi | B25J 9/1664 701/26 |
| 2011/0231018 | A1* | 9/2011 | Iwai | B25J 9/1664 700/253 |
| 2012/0239191 | A1* | 9/2012 | Versteeg | G06N 3/004 700/246 |
| 2014/0129027 | A1* | 5/2014 | Schnittman | G05D 1/0219 700/253 |
| 2016/0271795 | A1* | 9/2016 | Vicenti | B25J 9/163 |
| 2016/0297072 | A1* | 10/2016 | Williams | G05D 1/0274 |
| 2017/0255203 | A1* | 9/2017 | Sofman | G05D 1/0274 |
| 2017/0261996 | A1* | 9/2017 | Trehard | G05D 1/024 |

OTHER PUBLICATIONS

Amato N.M., et al., "Probabilistic Roadmap Methods are Embarrassingly Parallel", Robotics and Automation, 1999 Proceedings. 1999 IEEE, International Conference on Detroit, MI, USA, May 10-15, 1999, Piscataway, NJ, USA, IEEE, US, vol. 1, May 10, 1999, XP010336473, pp. 688-694.

International Search Report and Written Opinion—PCT/US2016/060400—ISA/EPO—dated Feb. 15, 2017.

* cited by examiner

SIMULTANEOUS MAPPING AND PLANNING BY A ROBOT

CROSS REFERENCE TO RELATED APPLICATION

This application claims the benefit under 35 U.S.C. § 119(e) to U.S. Provisional Patent Application No. 62/262,275, entitled "SIMULTANEOUS MAPPING AND PLANNING BY A ROBOT," filed on Dec. 2, 2015, the disclosure of which is expressly incorporated herein by reference in its entirety.

BACKGROUND

Field

Certain aspects of the present disclosure generally relate to machine learning, and more particularly, to improving systems and methods of simultaneous planning and mapping an environment by a robot.

Background

Robots may be designed to perform behaviors or tasks with a high degree of autonomy. A robot may use different modules and components for performing various tasks. For example, the robot may have different components for localization, mapping and planning. Localization is directed to solving the problem of determining where the robot is located. The robot receives input from its sensors to understand where the robot is located within the environment.

Mapping is directed to building a representation of the environment. For example, mapping is used to determine which portion of the environment is occupied and which parts are free space. Furthermore, mapping may prevent the robot from colliding with obstacles.

A map generated via the batch approach may be generated at once after multiple sensor measurements have been gathered throughout an environment to be mapped. That is, in the batch approach, all of the data of an environment to be mapped is gathered before calculating the map. Still, in some cases, a robot may not be able to gather all of the data in an environment prior to calculating the map.

Thus, in some cases, an incremental approach is specified for generating a map. A map generated via the incremental approach may be calculated based on initial data collected from the vicinity of the robot and updated with each new sensor measurement. Each new sensor measurement may be based on the robot changing its location, measuring a different area from the same location, or performing the same measurement for redundancy. For the incremental approach, the sensor measurements are independent from each other. Therefore, the robot may use assumptions when calculating the map. Thus, there may be some uncertainty when calculating an incremental map.

Planning is directed to determining how to perform a task after the robot knows the layout of the environment and how it will travel from point A to B. That is, in some cases, prior to moving from a current position to a target, it is desirable to determine the trajectory (e.g., path) to the target with the lowest cost from multiple candidate trajectories evaluated during a planning phase. That is, selecting a trajectory the robot includes evaluating a predicted density for each voxel along each of a plurality of candidate trajectories. The cost considers the variance of voxels and the resources used to travel from the current position to the target. Thus, when determining a trajectory, it may be desirable to determine an occupancy level for each location in a map and also to determine a probability distribution function (PDF) of the occupancy level. Furthermore, it may be desirable to determine a cost function based on the PDF to improve the planning of the path.

SUMMARY

In one aspect of the present disclosure, a method for substantially simultaneously planning a path and mapping an environment is disclosed. The method includes determining a mean of an occupancy level for a location in a map. The method also includes determining a probability distribution function (PDF) of the occupancy level. The method further includes calculating a cost function based on the PDF. The method still further includes simultaneously planning the path and mapping the environment based on the cost function.

Another aspect of the present disclosure is directed to an apparatus including means for determining a mean of an occupancy level for a location in a map. The apparatus also includes means for determining a PDF of the occupancy level. The apparatus further includes means for calculating a cost function based on the PDF. The apparatus still further includes means for simultaneously planning the path and mapping the environment based on the cost function.

In another aspect of the present disclosure, a non-transitory computer-readable medium with non-transitory program code recorded thereon is disclosed. The program code is for substantially simultaneously planning a path and mapping an environment. The program code is executed by a processor and includes program code to determine a mean of an occupancy level for a location in a map. The program code also includes program code to determine a PDF of the occupancy level. The program code further includes program code to calculate a cost function based on the PDF. The program code still further includes program code to simultaneously plan the path and map the environment based on the cost function.

Another aspect of the present disclosure is directed to an apparatus for substantially simultaneously planning a path and mapping an environment having a memory unit and one or more processors coupled to the memory unit. The processor(s) is configured to determine a mean of an occupancy level for a location in a map. The processor(s) is also configured to determine a PDF of the occupancy level. The processor(s) is further configured to calculate a cost function based on the PDF. The processor(s) is still further configured to simultaneously plan the path and map the environment based on the cost function.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
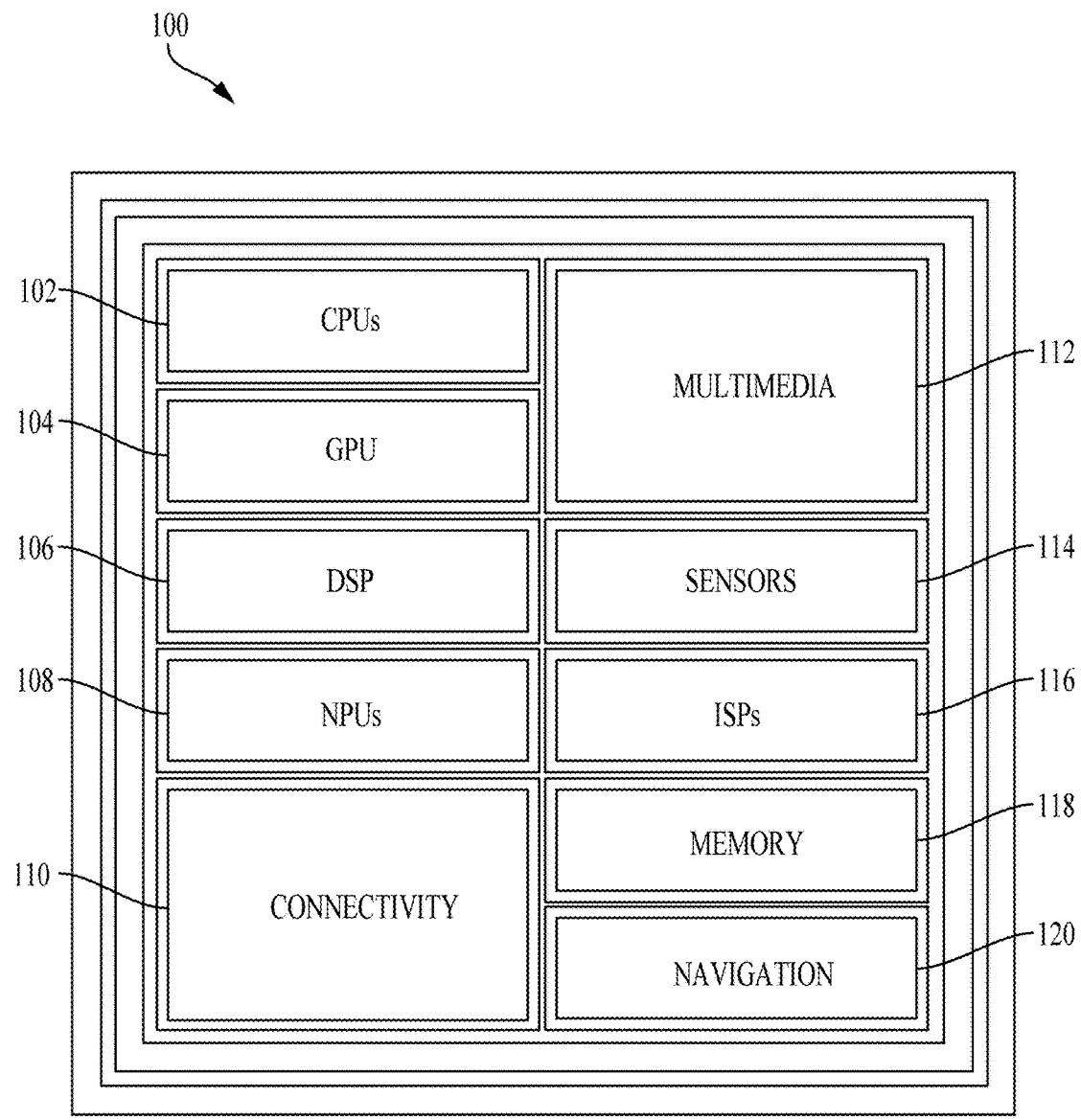
FIG. 1 illustrates an example implementation of simultaneously planning a path and mapping an environment by a robot using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

For autonomous systems, such as robots, it is desirable to construct an accurate map of the robot's surroundings. The map may be generated via a sensor, such as a stereo vision sensor. Furthermore, when constructing maps for large environments, voxel sizes are increased to keep the computation tractable.

In one configuration, to determine a map, the map may be partitioned into voxels (e.g., cells). Each voxel may have a state of being occupied (e.g., full), partially occupied, or empty. When generating a map using the incremental approach (e.g., incremental data), conventional techniques may calculate inconsistent maps, may not account for the uncertainty in a determined occupancy level of a voxel, and/or may not determine the occupancy level (e.g., full, partially full, or empty) of voxels. For example, in conventional systems, when calculating a map using the incremental approach, a voxel is either zero (e.g., empty) or one (e.g., full). Conventional systems do not consider the occupancy level of a voxel when calculating a map. In the present disclosure, occupancy level may refer to the ratio of an occupancy over a space. Furthermore, occupancy level may also be referred to as occupancy and/or density.

Aspects of the present disclosure determine the occupancy level of a voxel and also determine a probability distribution function (PDF) of an occupancy level given data observed by an autonomous device, such as a robot. Additionally, aspects of the present disclosure determine a cost function based on the PDF. Finally, aspects of the present disclosure plan a path and map the environment based on the cost function. In one configuration, the path planning and mapping are performed simultaneously.

FIG. 1 illustrates an example implementation of the aforementioned method of mapping and planning by a robot using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for determining a probability distribution function (PDF) of an occupancy level for a location. The instructions loaded into the general-purpose processor 102 may also comprise code for calculating a cost function based on the PDF. The instructions loaded into the general-purpose processor 102 may also comprise code for simultaneously planning the path and mapping the environment based on the cost function.

Figure 2:
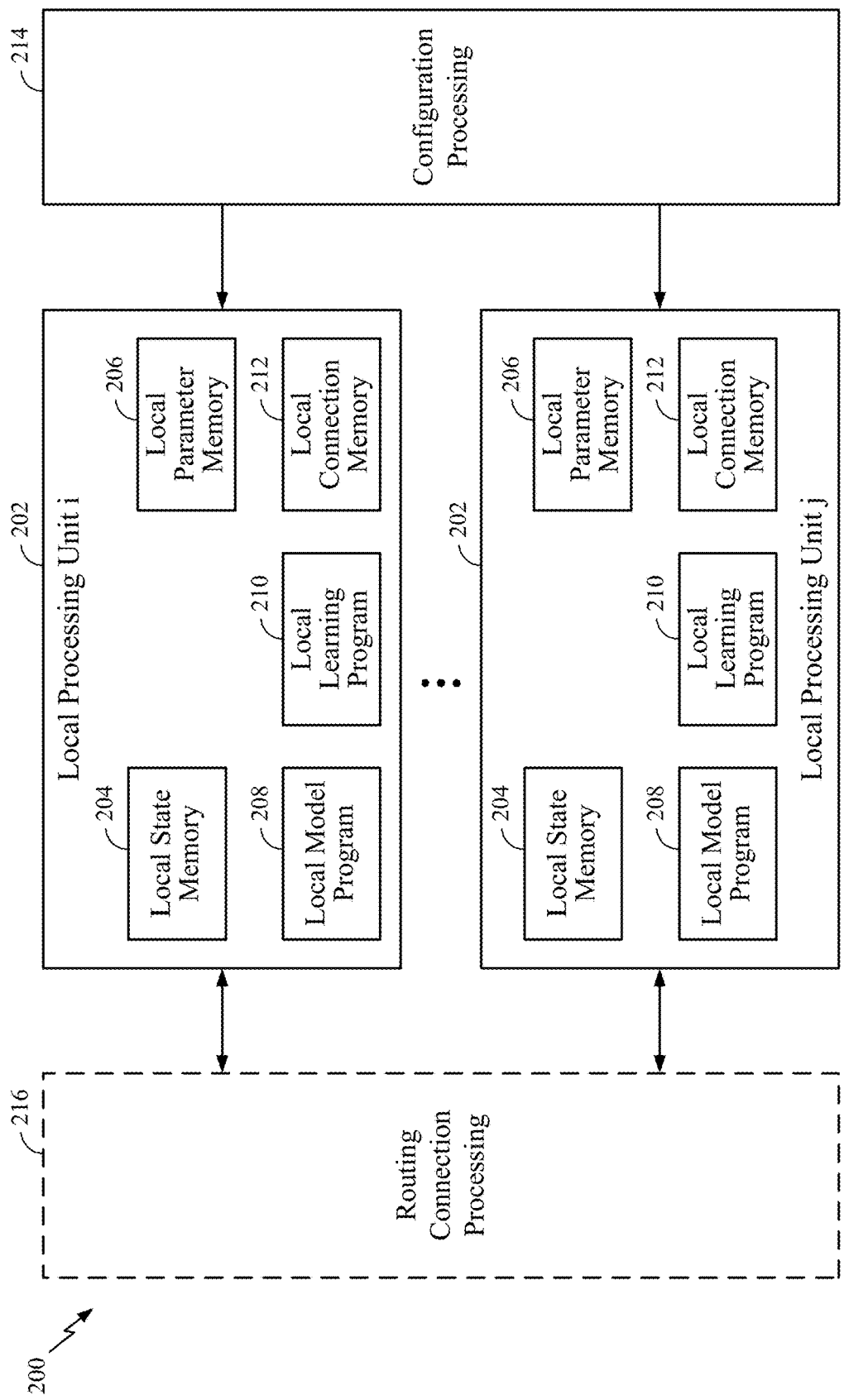
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a machine learning model is configured determining a mean of an occupancy level for a location in a map, determining a probability distribution function (PDF) of the occupancy level, calculating a cost function based on the PDF, and/or simultaneously planning the path and mapping the environment based on the cost function. The model includes a determining means, calculating means, and/or simultaneously mapping and planning means. In one aspect, the aforementioned means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Simultaneous Mapping and Planning by a Robot

As previously discussed, aspects of the present disclosure are directed to determining an occupancy level of each voxel and determining a confidence level of a determined occupancy level. The confidence level may be referred to as a probability distribution function (PDF) of a voxel given data observed by a device, such as a robot (e.g., autonomous device). A confidence level of a map may be based on the confidence level of each of the voxels in the map. Furthermore, based on the PDF, the robot may be able to plan a route with the least likelihood of collision with an object (e.g., the safest route). The safest route may be determined based on a cost function.

In one configuration, a mapping module is specified for a device, such as a robot. The mapping module may be a digital signal processor (DSP), app-processor, graphics processing unit (GPU), and/or another module. The mapping module may be specified to improve the accuracy of maps generated using incremental data. Furthermore, the mapping module may process the occupancy level of voxels (e.g., enable large voxels and reduce computational complexity), and/or incorporate a sensor model, such as a stochastic sensor model, in map construction. Additionally, the mapping module may process the occupancy levels of voxels in a map and determine the confidence level of the determined occupancy. Finally, the mapping module may be used for improving planning under uncertainty. Aspects of the present disclosure are directed to generating a map for a robot and selecting a trajectory with the lowest cost. Still, the maps are not limited to being generated for a robot and are contemplated for any type of device, such as, for example a car, airplane, boat, and/or human. Furthermore, in one configuration, the device is autonomous.

Figure 3A:
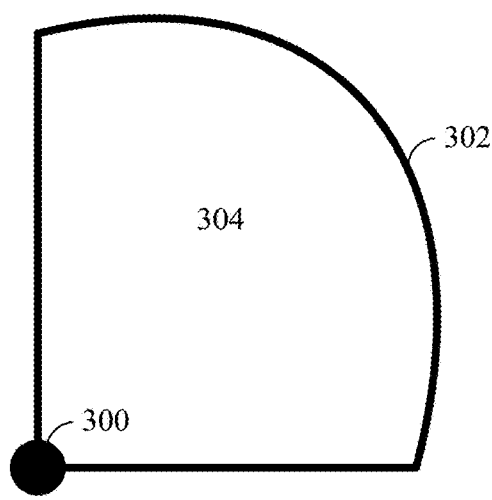
FIGS. 3A, 3B, and 3C illustrate examples of a robot performing measurements according to aspects of the present disclosure.
Figure 3B:
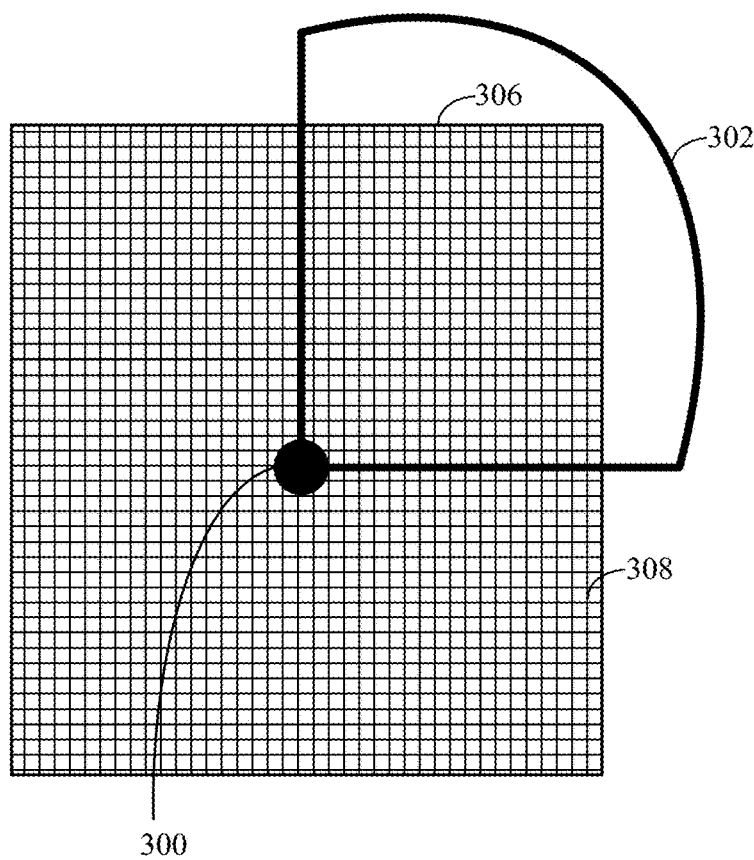
Figure 3C:
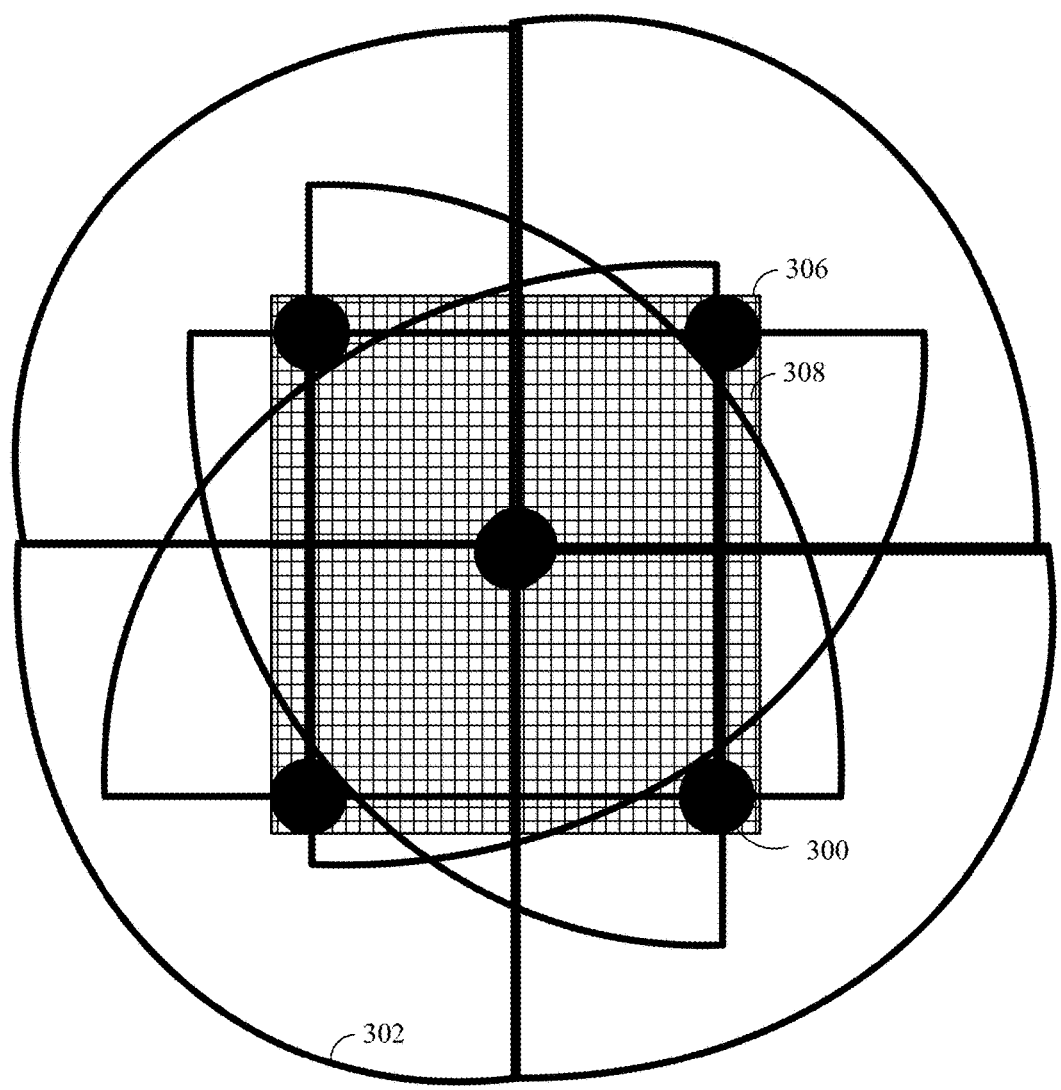

FIGS. 3A, 3B, and 3C illustrate examples of a robot performing measurements according to aspects of the present disclosure. FIG. 3A illustrates an example of a robot 300 performing measurements via one or more sensors (not shown) of the robot 300. Measurements may refer to a measurement obtained based on whether a ray is intercepted by a voxel. Of course, aspects of the present disclosure are not limited to measurement rays and are also contemplated for other types of measurements. As shown in FIG. 3A, the sensor of the robot 300 may have a measurement cone 302 such that the sensor receives measurements from an area 304 within the cone 302.

As shown in FIG. 3B, according to an aspect of the present disclosure, the robot 300 may be placed in an environment to be mapped 306. The environment to be mapped 306 may include multiple voxels 308. As shown in FIG. 3B, based on the measurements by the sensor, the sensor may determine an occupancy level of each voxel 308 within the measurement cone 302. It should be noted that the voxels 308 of FIG. 3B are for illustrative purposes, the voxels of the present disclosure are not limited to the size or number of voxels shown in FIG. 3B.

As shown in FIG. 3C, according to an aspect of the present disclosure, the robot 300 may perform measurements at different locations. For an incremental approach, the map is generated based on measurements obtained at a first location and the generated map is updated as the robot moves to different locations in the environment to be mapped 306. The measurements at different locations are performed at different times (e.g., different time steps). For example, a robot 300 may perform a first measurement at a first location at a first time and a second measurement at a second location at a second time.

Figure 4:
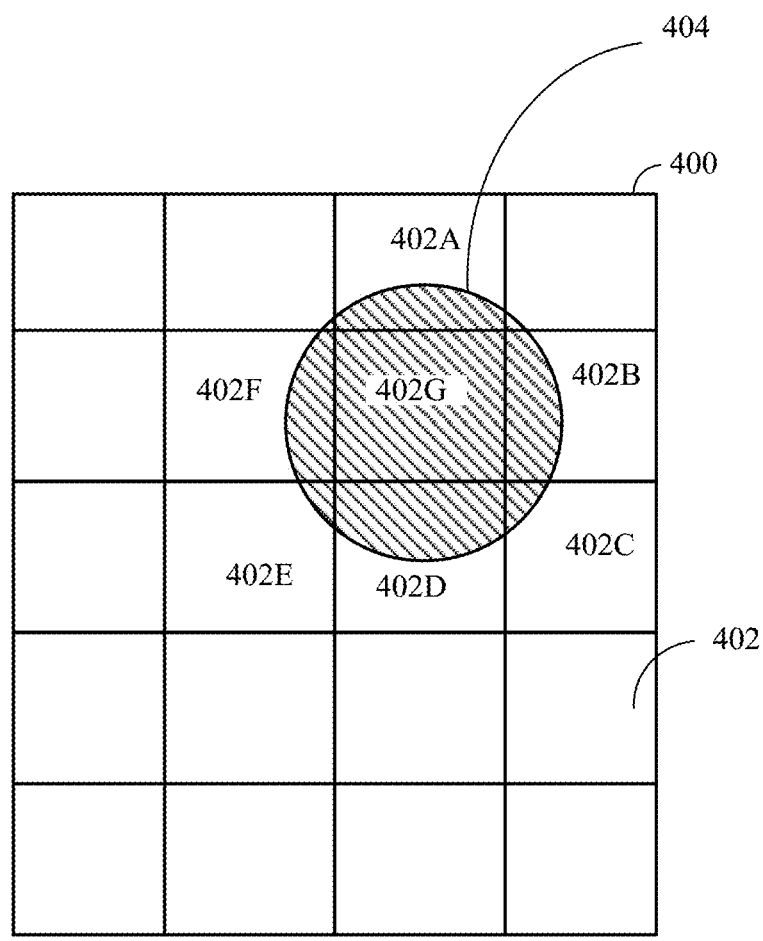
FIG. 4 illustrates an example of an environment to be mapped according to aspects of the present disclosure.

FIG. 4 illustrates an example of an environment to be mapped 400 according to aspects of the present disclosure. As shown in FIG. 4, a robot (not shown) may create a grid of the environment to be mapped 400. The grid forms multiple voxels 402. Furthermore, in this example, an object 404 is within the environment to be mapped 400. Thus, as shown in FIG. 4, some of the voxels 402 are empty, some of the voxels 402A-402F are partially occupied, and one voxel 402G is fully occupied.

As shown in FIGS. 3B, 3C, and 4, an environment to be mapped may be represented as a grid. Each cell in the grid may be referred to as a voxel. Furthermore, as previously discussed, each voxel has an occupancy level. The occupancy level may be referred to as the occupancy and/or the density. The occupancy level (d) may be a variable, such as a random variable, with a mean and a variance. The mean refers to the expected occupancy level given the measurements that have been collected by the sensor from time step 0 to time step k ($z_{o:k}$). The variance refers to the certainty of the occupancy level given the measurements that have been collected by the sensor from time step 0 to time step k ($z_{o:k}$).

The mean of the occupancy level may be calculated from:

$$\hat{d} = E[d|z_{o:k}]$$

The variance of the occupancy level may be calculated from:

$$\sigma^d = Var[d|z_{o:k}]$$

The mean and variance are determined from all of the obtained measurements ($z_{0:k}$). In conventional systems, uncertainty is not specified for the measurements of voxels. For example, in conventional systems, if the reported occupancy level (e.g., cell posterior) is 0.5, a route planner may not determine if the 0.5 resulted from a few measurements or hundreds of measurements. Thus, the reliability of the occupancy level is unknown. Therefore, conventional systems may result in inconsistent maps due to inaccurate assumptions.

After determining an occupancy level, such as a mean occupancy level, of each voxel of multiple voxels, it is desirable to determine a confidence level (e.g., probability) of the determined occupancy level. For example, if multiple measurements have indicated that a voxel is occupied, there is a high probability that the voxel is occupied in comparison to a situation where only one measurement has indicated that a voxel is occupied. Furthermore, if an occupancy level of a voxel has a low confidence level (e.g., a confidence level below a threshold), the robot may move to various locations to take additional measurements to improve the confidence in the occupancy level.

In one configuration, an update rule is specified to determine the probability (p) of an occupancy level (d) for a voxel i of a map (m). The probability (p) may be referred to as a probability distribution function (PDF) that includes the mean and the variance (e.g., confidence of the occupancy level). In one configuration, the mean and variance may be extracted from the PDF of the occupancy level of a voxel. Furthermore, a path may be planned based on the mean and variance. That is, based on the mean and variance, a cost is determined for each path. In one configuration, the robot selects the path with the lowest cost. The cost may be based on the mean occupancy level, the variance, and/or resources used to traverse the path. Resources may refer to the resources used for traversing a path, such as fuel and/or energy.

Figure 5A:
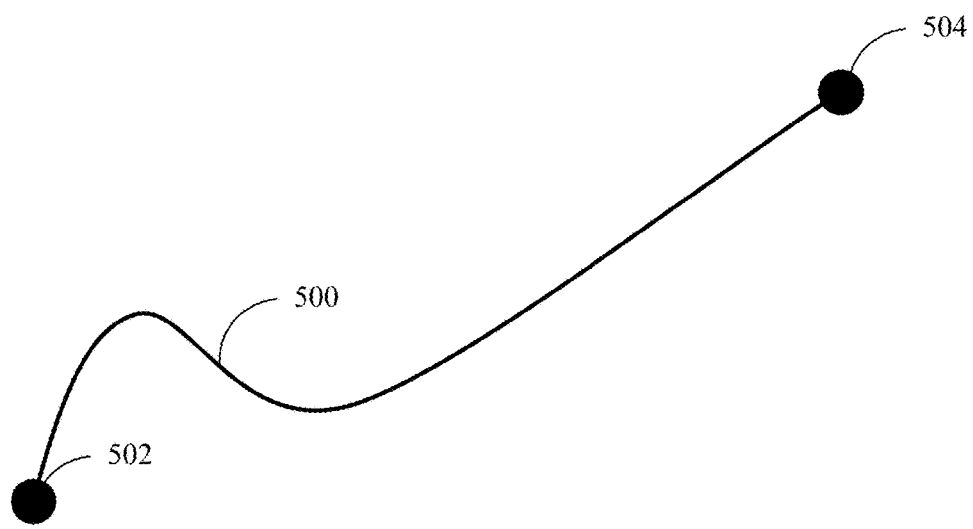
FIGS. 5A, 5B, and 5C illustrate various aspects of a trajectory in accordance with aspects of the present disclosure.
Figure 5B:
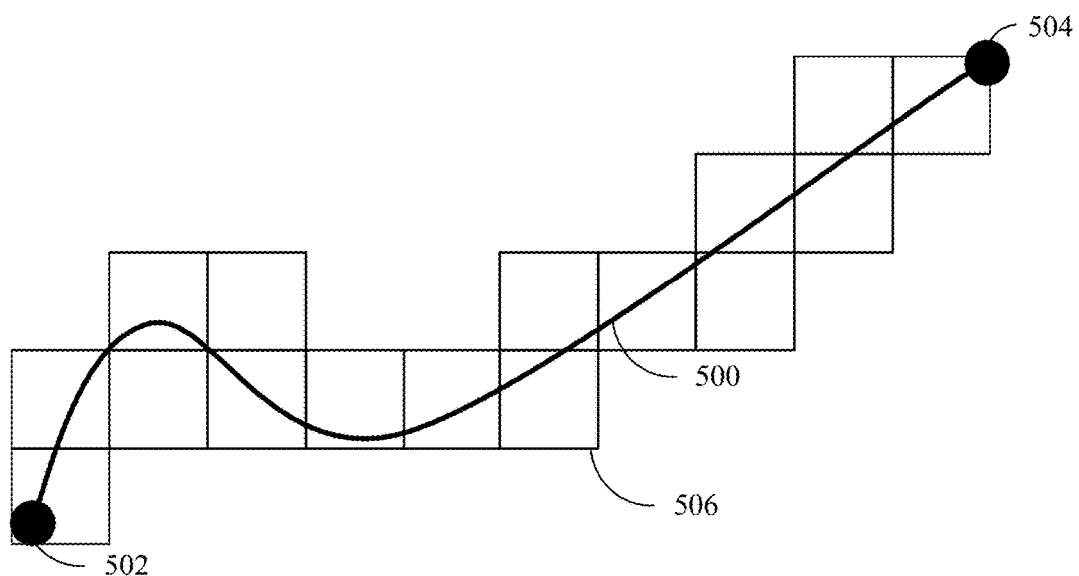

FIG. 5A illustrates an example of a path 500 with a starting position 502 and an ending position 504. Furthermore, as shown in FIG. 5B, the robot predicts the voxels 506 that will be intercepted by the path 500. If the voxels 506 are in an area that has already been mapped, then the mean and variance of each voxel 506 is known based on measurements that have been collected by the sensor from time step 0 to time step k ($z_{o:k}$).

In some cases, one or more voxels 506 may be in an unmapped area. Additionally, the measurements of voxels 506 in the mapped area may need to be updated. For example, a voxel may be in a mapped area, however, the robot may have only performed one measurement on the voxel. As another example, noise data received from the robot sensors may not be fully reliable. For example, noisy interference picked up by robot sensors may mislead a robot into determining a space is occupied when it is actually free. Therefore, there may be a high variance in the measurement of the voxel. Thus, when planning a path, the robot may determine the time steps along the path that provide opportunities for the robot to obtain measurements at each voxel 506.

Figure 5C:
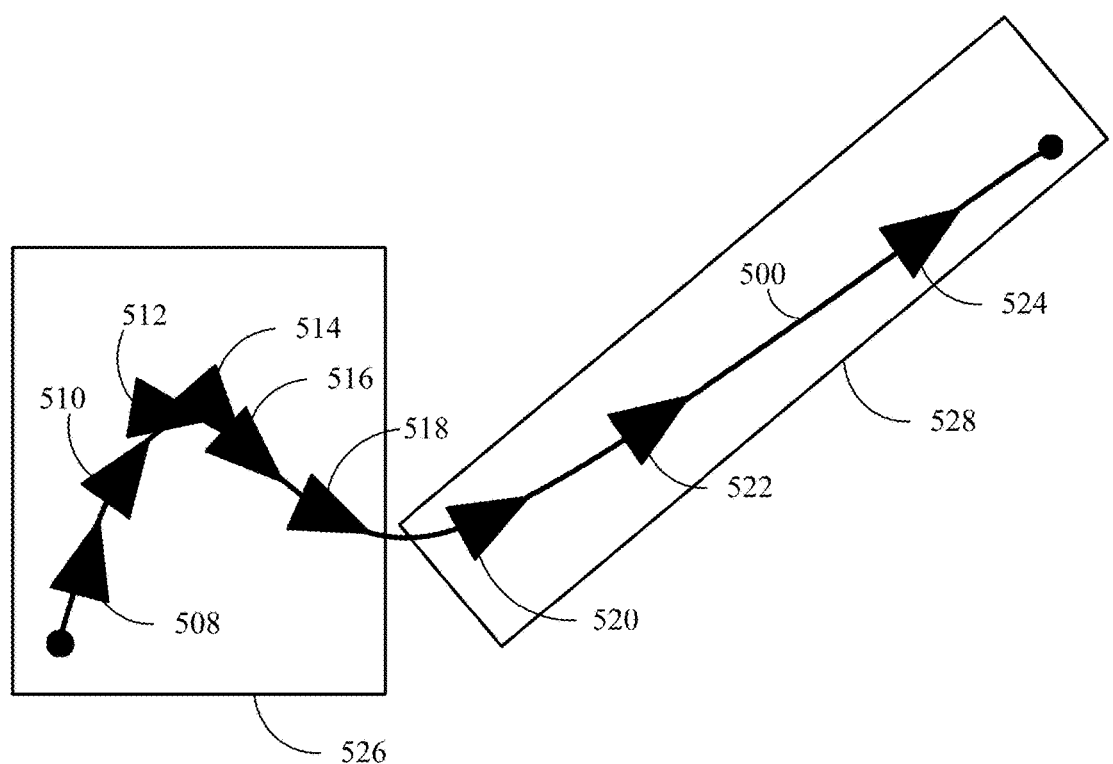

FIG. 5C illustrates an example of time steps 508-524 where the robot has opportunities to obtain measurements of the voxels 506 (not shown in FIG. 5C) along the path 500. As an example, the distance between each time step from a first time step 508 to a sixth time step 518 in a first portion 526 of the path 500 is less than the distance between each time step from the seventh time step 520 to a ninth time step 524 in a second portion 528 of the path 500. That is, as shown in FIG. 5C, the first portion 526 of the path 500 curves. Therefore, the robot may travel at a reduced speed to navigate the curve. Based on the reduced speed, the robot may increase the opportunities to obtain measurements along the path. That is, the distance between time steps 508-518 in the first portion 526 of the path 500 is reduced. As a result of the reduced distance between time steps 508-516 in the first portion 526, the accuracy of the measurements may increase in the first portion 526. A number of time steps between a first point and a second point may be indicative of a robot's speed.

Furthermore, as shown in FIG. 5C, the second portion 528 of the path 500 is a substantially straight line. Therefore, the robot may travel at an increased speed along the straight line. Based on the increased speed, the robot may decrease the opportunities to obtain measurements along the path. That is, the distance between time steps 520-524 in the second portion 528 of the path 500 is increased. As a result of the increased distance between time steps 520-524 in the second portion 528, the accuracy of the measurements may decrease in the second portion 528.

According to an aspect of the present disclosure, the robot does not travel from a first point to a second point when planning a route. For example, when planning the path 500, the robot does not travel from a starting position 502 and an ending position 504. Rather, the robot determines the voxels, such as the voxels 506 of FIG. 5B, and predicts the time steps, such as the time steps 508-524 of FIG. 5C, that will be available along the path.

As previously discussed, an occupancy level may be updated based on observations from each time step. Thus, when planning a route, the robot determines the number of time steps (e.g., opportunities for observations) along the route. The time steps may be predicted based on the velocity of the robot. The robot may also consider its orientation (e.g., a direction the robot will be facing) at each time step. For each predicted time step, the robot may predict the occupancy level of the voxels based on the current time step.

Furthermore, after determining an occupancy level, such as a mean occupancy level, of each voxel of multiple voxels, it is desirable to determine a confidence level (e.g., probability) of the determined occupancy level. A probability distribution function may use the determined occupancy level. Additionally, a cost function is calculated for each path based on the mean occupancy level and the variance of the voxels. The robot may determine a cost function for multiple paths and may select a path having the lowest cost.

In one configuration, an update rule is specified to determine the probability (p) of an occupancy level (d) of a map (m). The probability (p) may be referred to as a probability distribution function (PDF) that includes the mean and variance (e.g., confidence of the occupancy level). The PDF for an occupancy level of a voxel i may be calculated as follows:

$$p(d \mid z_{0:k}) = \frac{p(z_k \mid d)p(d \mid z_{0:k-1})}{p(z_k \mid z_{0:k-1})} \qquad (1)$$

In EQUATION 1, $z_{0:k}$ are the predicted measurements that will be collected by the sensor from time step 0 to time step k. That is, EQUATION 1 recursively determines the probability of the occupancy level (d) at time step k given the sensor measurements from time step 0 to time step k ($z_{0:k}$). The occupancy level (d) is for the entire map. That is, d is the collection of all voxels in the map $d^1$ to $d^g$, where g is the number of voxels in the map. In EQUATION 1, $p(z_k|d)$ is the likelihood of obtaining a measurement (z) at time step k given the occupancy level (d) of all voxels in the map. Furthermore, in EQUATION 1, $p(d|z_{0:k-1})$ is the previously calculated occupancy level (d) of a map at time step k given the sensor measurements from time step 0 to time step k-1 ($z_{0:k-1}$). Of course, because the robot does not move along the path when determining the cost of each path, the PDF of EQUATION 1 is based on predicted measurements.

After calculating the PDF, the robot may determine the probability (p) of having a map (m) at the given time step (k). A map (m) includes voxels i to n. The PDF for an existence of a map (m) at time step (k) may be calculated as follows:

$$p(m_k \mid z_{0:k}) = \frac{p(z_k \mid m_k)p(m_k \mid z_{0:k-1})}{p(z_k \mid z_{0:k-1})} \qquad (2)$$

As discussed above, the PDF of the map and/or each voxel may be updated after each time step. As an example, a voxel may have a first PDF at a first time step, then the PDF is updated based on measurements performed at a second time step to generate a second PDF, and the second PDF is updated again based on measurements performed at a third time step to generate a third PDF. A map may be generated at each time step, such that the map is incrementally updated based on the updated PDFs of the voxels of the map. EQUATION 2 may be expressed as $(\hat{d}_{k+1}, \sigma_{k+1}^d) = g(\hat{d}_k, \sigma_k^d)$ to focus on the mean and variance of the distribution $p(d|z_{0:k})$.

As discussed above, a map (m) includes voxels i to n. Thus, the occupancy level (d) of a map (m) (e.g., full map) at time step k may be represented as $\bar{d}_k = (d_k^1, d_k^2, \ldots, d_k^n)$. That is, $\bar{d}_k$ represents the occupancy level of all voxels i to n at time step k. A mean occupancy level and variance may be determined for each voxel based on the PDF of each voxel.

As previously discussed, when planning a route, the robot determines the voxels that will intersect the route. Furthermore, when planning the route, the robot also determines the number of time steps (e.g., opportunities for observations) along the route. Thus, for each location along the route (x), the robot may determine a voxel that corresponds to a location (x) and the robot may extract the predicted mean and variance associated with the specific voxel. That is, rather than using the static values for mean and variance for voxels along the path, the mean and variance of density are predicted for voxels along the path. Once the probability for all voxels at a particular time step is known, the probabilities for the map in the next time step may be computed.

The mean and variance of a voxel (x) at a location may be extracted as follows:

$$(\hat{d}, \sigma^d) = \mathrm{Den}(x) = (\hat{d}(x), \sigma^d(x)) \qquad (3)$$

In EQUATION 3, the function $(\hat{d}(x), \sigma^d(x))$ returns the mean occupancy level $(\hat{d})$ and the variance $(\sigma^d)$ associated with a voxel (x) for a location on the path (e.g., trajectory). The location may be any location on the map or along the trajectory. The robot may determines which voxel (x) falls within the location. The function Den( ) may be used to determine which voxel (x) falls within the location and returns the mean and variance for that voxel.

After determining the mean occupancy level $(\hat{d})$ and the variance $(\sigma^d)$ associated with a voxel for a location x on the path, a cost (c) is associated with an action (u) at a location (x) at time step k. The cost function may be a linear or non-linear combination of the mean occupancy level and the variance. The cost (c) may be determined as follows:

$$c(x_k, u_k) = c(x_k, u_k; \bar{d}_k) = \alpha \hat{d}_k(x_k) + \beta \sigma_k^d(x_k) + \gamma \|u\| \qquad (4)$$

In EQUATION 4, the mean occupancy level $(\hat{d})$ at location (x) at time step k is penalized by $\alpha$. That is, if the mean occupancy level $(\hat{d})$ is high (e.g., greater than a threshold) it is more likely that the voxel is occupied. Therefore, to prevent a collision, the mean occupancy level $(\hat{d})$ is penalized to prevent the selection of a location on the path that has an increased probability of being occupied.

Furthermore, in EQUATION 4, the variance $(\sigma^d)$ of the voxel (d) associated with the location (x) at time step k $(\sigma_k^d)$ is penalized by $\beta$. That is, if the variance $(\sigma^d)$ is high (e.g., greater than a threshold) there is an increased likelihood that the occupancy measurement is incorrect. Specifically, a variance is inversely proportional to a confidence of a measurement, such that a high variance indicates a low confidence in a measurement (e.g., occupancy level) and a low variance indicates a high confidence in a measurement. Therefore, to prevent a collision or entering a voxel with a low confidence score, the variance $(\sigma^d)$ is penalized to prevent the selection of a location on the path that has a decreased confidence score.

Additionally, in EQUATION 4, an action (u) is penalized by $\gamma$. The action may refer to resource use or control cost, such as fuel. The action (u) is penalized to prevent excess expenditure of resources. For example, a path may avoid obstacles but the path may increase the amount of resources used to move from a first location to a second location. Therefore, the action (u) is penalized to prevent the selection of a path that increases the use of resources, such as fuel. The penalization coefficients $\alpha$, $\beta$, and $\gamma$ are variables that may be adjusted based on desired performance. Each penalization coefficient $\alpha$, $\beta$, and $\gamma$ may determine the importance of each factor (e.g., mean, variance, and cost). The mean may be penalized because a lower mean corresponds to a lower chance of collision. The variance may be penalized because lower variance corresponds to higher confidence. Furthermore, the cost may be penalized because low cost corresponds to lower fuel consumption.

The cost (c) may be determined for every action (u) at every location (x). Therefore, each path is associated with a series of locations $x_T$ and a series of actions $u_{T-1}$ to move from a first location $x_{T-1}$ to a second location $x_T$. For example, a path, such as the path 500 of FIGS. 5A-5C, may be represented as follows:

$$\mathrm{path} = (x_0, u_0, x_1, u_1, \ldots, x_{T-1}, u_{T-1}, x_T).$$

The cost function is calculated for all of the locations (x) and actions (u) along a path. Thus, the cost of a path may be calculated as follows:

$$C(x_o, \text{path}; \bar{d}_0) = E\Sigma_{k=0}^{T} c(x_k, u_k; \bar{d}_k) \qquad (5)$$

As shown in EQUATION 5, the cost (C) of a path is the summation of the cost function ($c(x_k, u_k; \bar{d}_k)$) for each location and action. Furthermore, because the calculations are based on predictions, as opposed to actual calculations, the summation is the average E (e.g., expected value) of the sum of the costs. In one configuration, after calculating the cost (C) of each path, the robot selects the path with the lowest cost.

Figure 6A:
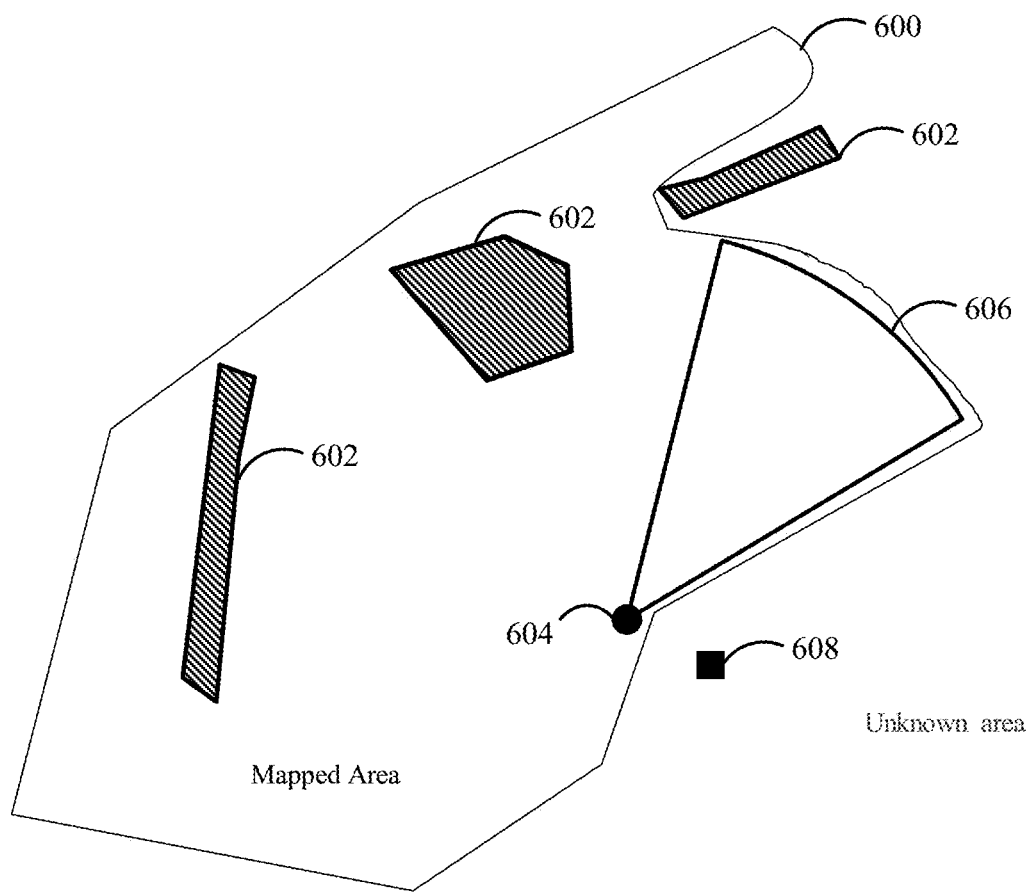
FIGS. 6A-6G are examples of a robot in a mapped area according to aspects of the present disclosure.

FIG. 6A illustrates an example of a robot 604 in a mapped area 600 according to an aspect of the present disclosure. The mapped area 600 refers to an area that has been mapped via the robot's sensors. That is, the robot 604 has seen the mapped area 600 using the robot's sensors. Furthermore, an unknown area exists beyond the border of the mapped area 600. The unknown area is an area that has not been seen by the robot's sensors. Both the mapped area 600 and the unknown area may include obstacles 602. The obstacles 602 in the mapped area 600 may be known to the robot and the obstacles in the unknown area are not known. A robot 604 has a field of view 606 based on the robot's orientation and/or the orientation of the robot's sensors. Furthermore, the robot 604 may be directed to move from its current position to a target location 608.

Figure 6B:
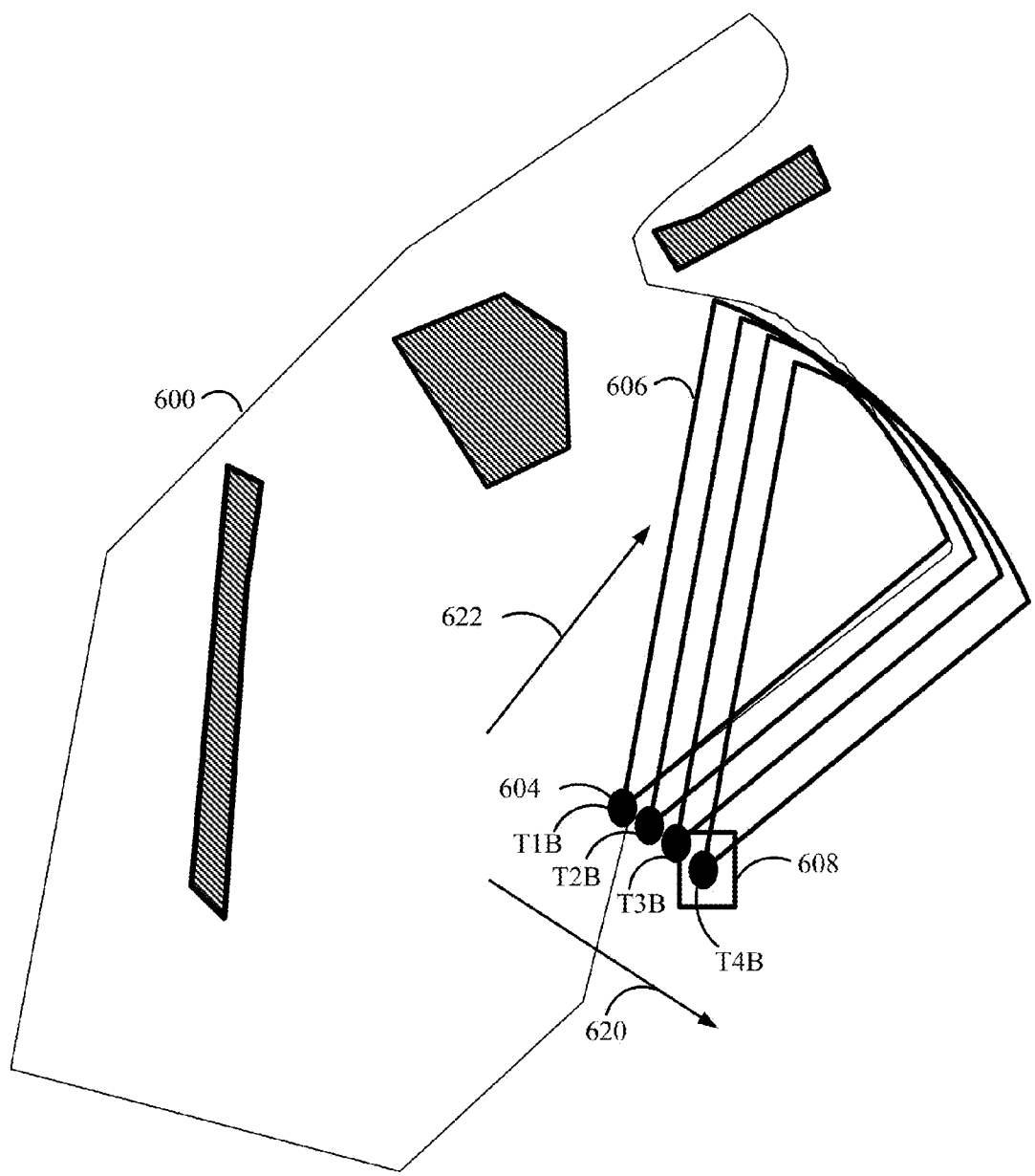

FIG. 6B illustrates another example of the robot 604 in the mapped area 600 according to an aspect of the present disclosure. Specifically, FIG. 6B illustrates an example of a trajectory for the robot 604 to move from its current position to the target 608. In this example, for the selected trajectory, the robot's field of view 606 is maintained in a forward view while the robot 604 moves sideways, relative to the field of view 606, to reach the target location 608. Furthermore, as shown in FIG. 6B, multiple time steps T1B-T4B may be specified for the robot to travel from its current location to the target 608. As previously discussed, each time step refers to an opportunity for the robot to perform measurements.

In the example of FIG. 6B, the robot 604 is not viewing the direction of travel 620, rather, the robot 604 is viewing a forward direction 622 that is different from the direction of travel 620. Thus, because the robot 604 is not viewing the direction of travel 620 into an unknown area, the robot 604 may collide with unknown obstacles. Accordingly, when the robot is moving into the unknown area with a direction 622 of the field of view 606 being different from the direction of travel 620, the variance of the measurements obtained by the robot is high. As discussed above for EQUATION 4, the variance ($\sigma^d$) of the voxel (d) associated with the location (x) at time step k ($\sigma_k^d$) is penalized by β. Therefore, in this example, the high variance is penalized so that the cost of the trajectory of FIG. 6B is high. A trajectory with a high cost may be undesirable.

Figure 6C:
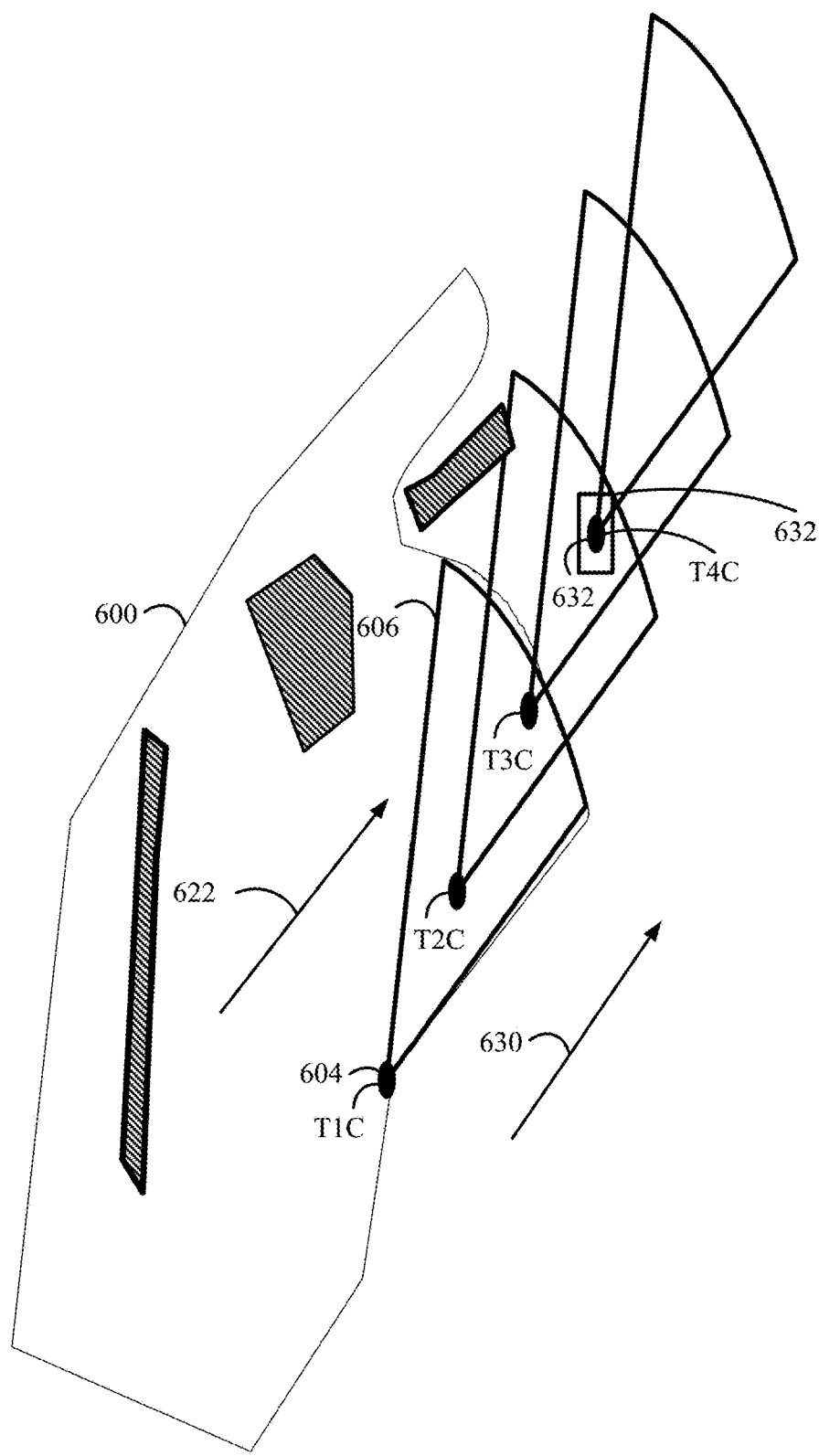

FIG. 6C illustrates yet another example of the robot 604 in the mapped area 600 according to an aspect of the present disclosure. Specifically, FIG. 6C illustrates an example of a trajectory for the robot 604 to move from its current position to a target 632 at an increased speed. In the example of FIG. 6C, the direction 622 of the robots field of view 606 is substantially aligned with the direction of travel 630 to the target 632. The speed of the robot may be reflected in the number of time steps T1C-T4C between the robot's initial position and the target 632. That is, a fewer number of time steps between the current position and a target position correlates to a faster travelling speed by the robot. In one configuration, the increased speed (e.g., fast movement) through an unknown region is penalized by the cost function. That is, the number of measurement opportunities may be reduced as a result of the increased speed of the robots 604. The reduction of measurement opportunities (e.g., time steps T1C-T4C) increases the variance of the measurements. As previously discussed, a high variance is penalized. Therefore, due to the high variance resulting from the increased speed of the trajectory of FIG. 6C, the cost of the trajectory of FIG. 6C is high.

Figure 6D:
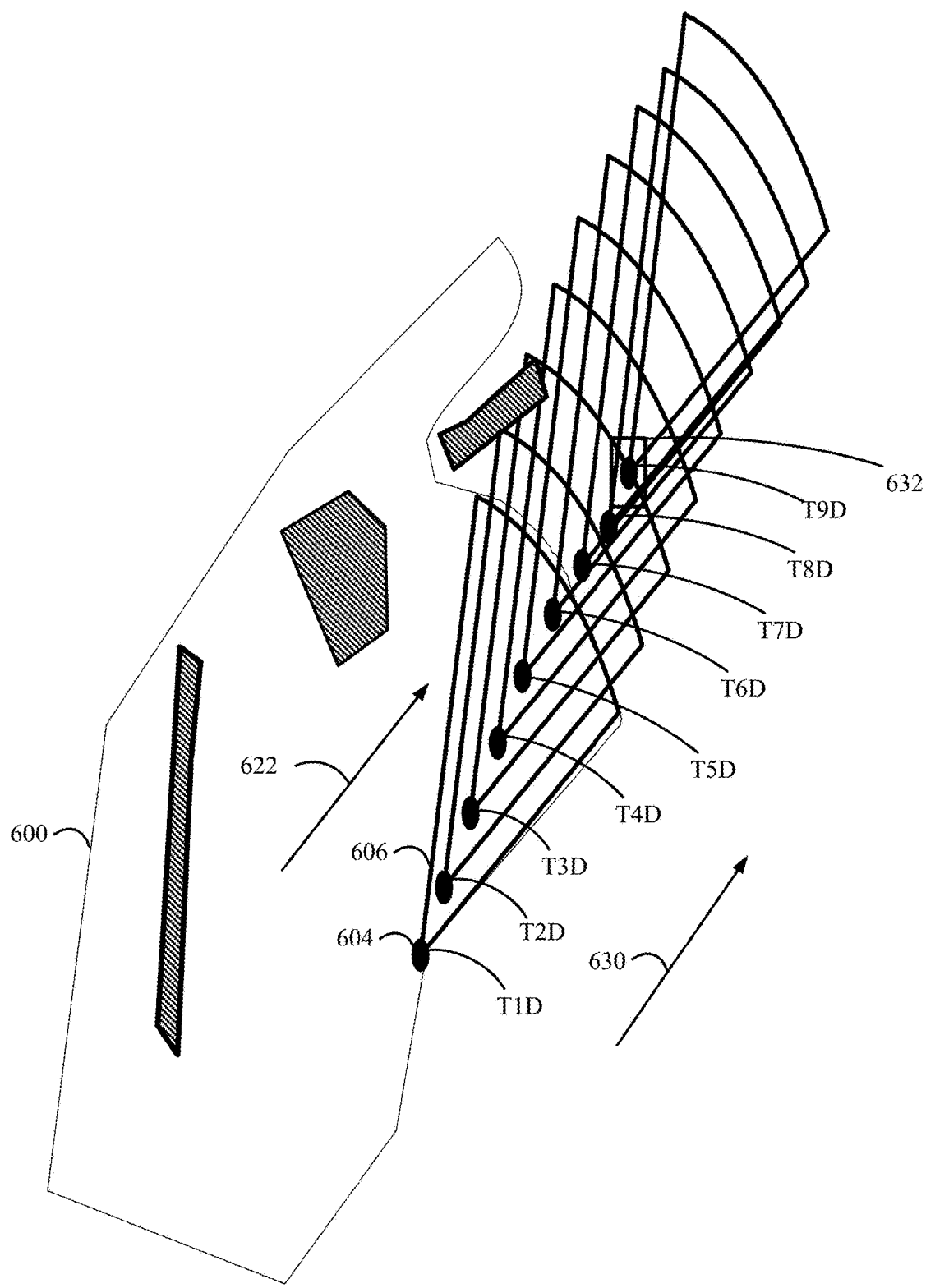

FIG. 6D illustrates yet another example of the robot 604 in the mapped area 600 according to an aspect of the present disclosure. Specifically, FIG. 6D illustrates a path where the robot takes an increased number of time steps in comparison to the number of steps of the example of FIG. 6C to reach the target 632. Additionally, in the example of FIG. 6D, the direction 622 of the robot's field of view 606 is substantially aligned with the direction of travel 630 to the target 632. The increased number of time steps may be a more favorable trajectory because the robot 604 is travelling to the target 632 at a moderate (e.g., reduced) speed in addition to the robot having its field of view 606 substantially aligned with the direction of travel 630 to the target 632.

The speed of the robot may be reflected in the number of time steps T1D-T9D between the robot's initial position and the target 632. That is, in FIG. 6C the robot used four time steps (T1C-T4C) to reach the target 632. In contrast, in the current example of FIG. 6D, the robot uses nine time steps (T1D-T9D) to reach the target 632. Due to the increased time steps, the robot 604 may increase the number of observations such that the level of uncertainty is reduced. The reduction of the uncertainty level causes a reduced variance for the observations of the voxels between the robot's initial position and the target 632. For example, based on the increased observations, if the robot observes an obstacle in the path, the robot has enough time to react accordingly. Thus, a low variance is desirable. Therefore, due to the low variance resulting from the increased observations for the trajectory of FIG. 6D, the cost of the trajectory of FIG. 6D is low. In the present examples, the robot 604 cannot predict the mean occupancy level of the voxels in the unknown area. Thus, when determining the cost of a trajectory, the robot 604 may assume the voxels in the unknown area are free. Still, based on the time steps and/or the robot's orientation along a trajectory, the robot 604 may predict the variance along the trajectory.

Figure 6E:
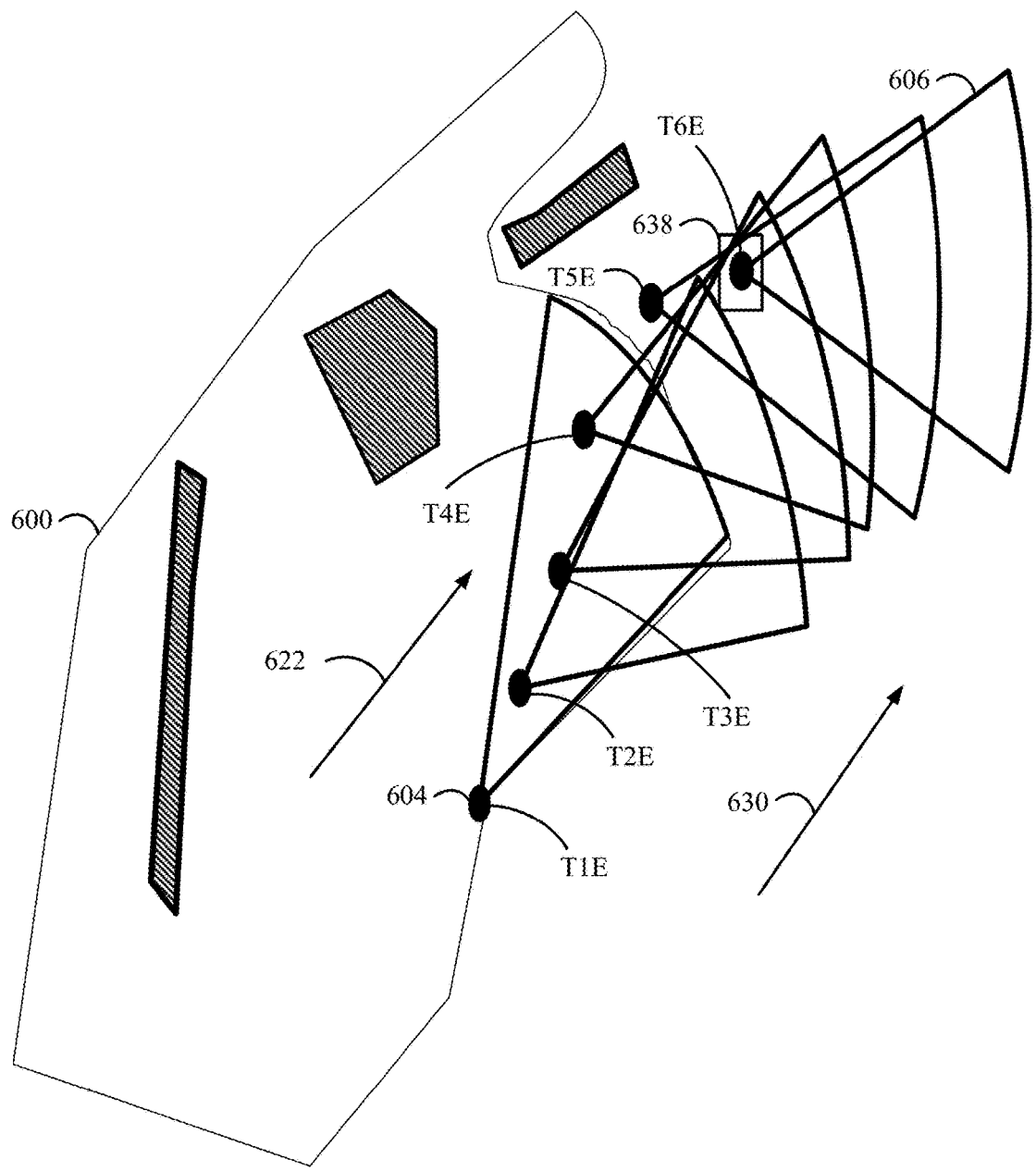

FIG. 6E illustrates yet another example of the robot 604 in the mapped area 600 according to an aspect of the present disclosure. When determining the cost of a trajectory, the robot 604 may also take a sensor model into account. For example, as shown in FIG. 6E, based on the number of time steps (T1E-T6E) between the initial position of the robot 604 and the target 638, the robot 604 plans to move at a moderate speed. Furthermore, as shown in FIG. 6E, the direction of travel 630 of the robot 604 is substantially similar to the direction 622 of the robot's field of view 606.

Still, as shown in FIG. 6E, some of the steps taken by the robot 604 are located in the edge of the previous step's field of view 606. For example, when moving from time step T4E to T5E, the robot 604 moves to the right of the field of view 606 of time step T4E. That is, at time step T5E, the robot 604 moves to an area that was not observed during a previous time step (e.g., time step T4E). In most cases, the edge of the sensor is unreliable. Therefore, the variance may increase because the robot 604 is moving to the edge of a field of view 606. In one configuration, the cost function accounts for movement along the edge of the field of view and penalizes such movement by increasing the variance of the time steps. The increase in the variance may be provided via a sensor model that accounts for the variables, such as the location of the robot relative to the field of view of a previous time step. Therefore, due to the high variance resulting from movement along the edge of the field of view 606, the cost of the trajectory of FIG. 6E is high.

The sensor model predicts an output of a sensor given a state of a robot. The state refers the location of the robot in an environment and the occupancy level of voxels of the map corresponding to the location of the robot. The map may be a stochastic map with a level of uncertainty. Thus, based on the uncertainty, the sensor model predicts the output of the sensor. The sensor model may be implemented as described in U.S. provisional patent application No. 62/262,339 filed on Dec. 2, 2015, in the names of AGHA-MOHAMMADI et al., the disclosure of which is expressly incorporated by reference herein in its entirety.

Figure 6F:
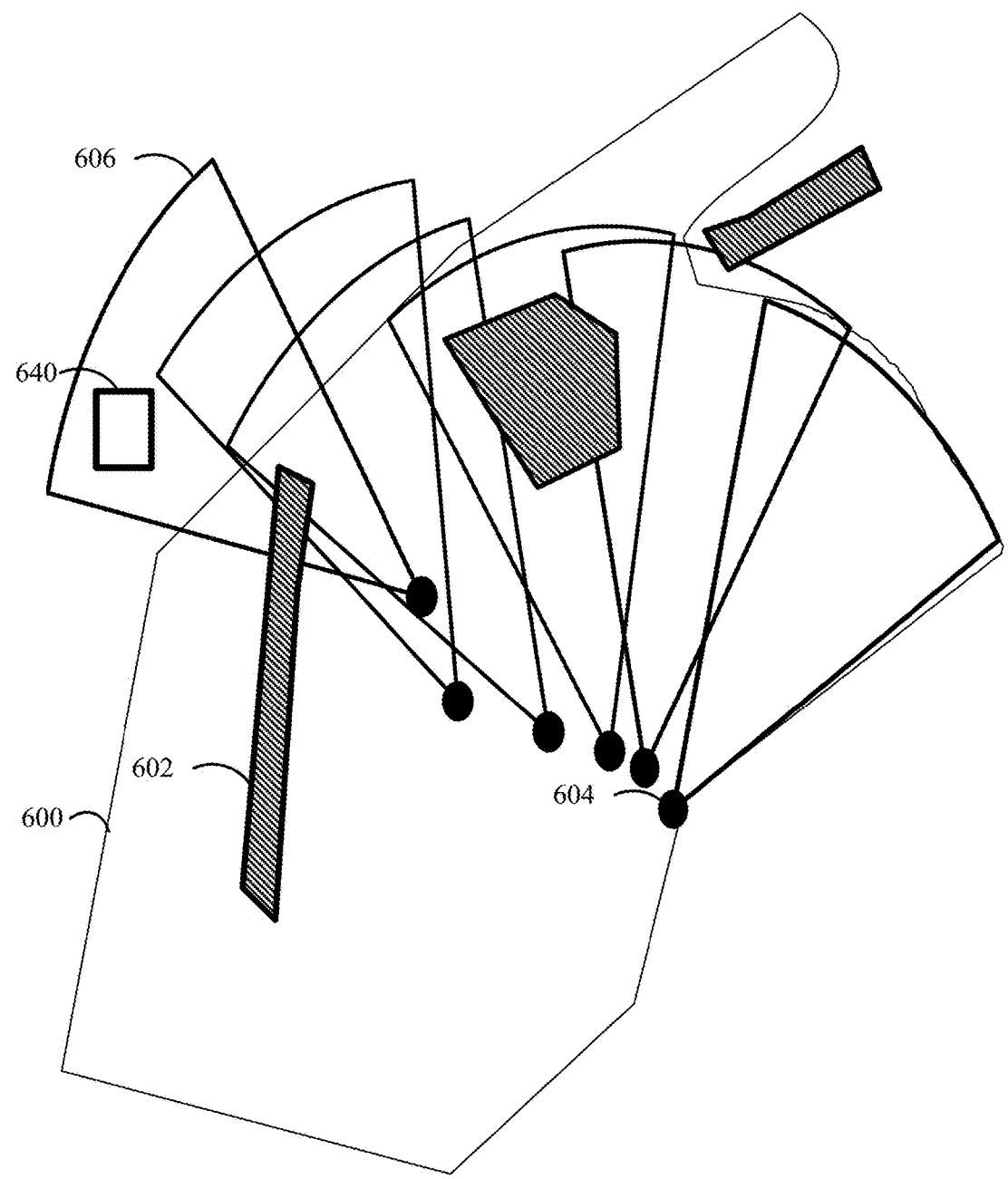
Figure 6G:
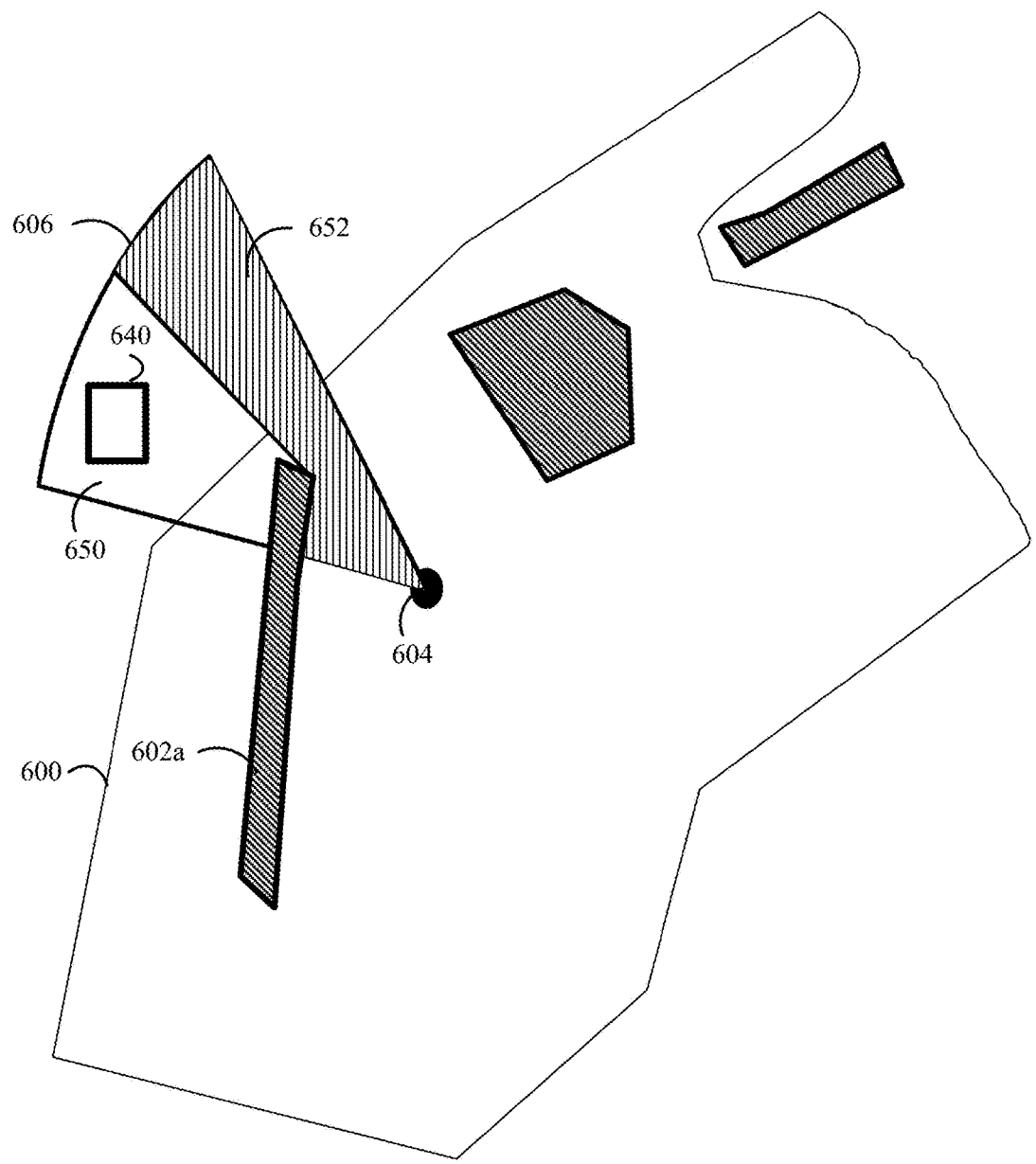

FIGS. 6F and 6G illustrate other examples of the robot 604 in the mapped area 600 according to aspects of the present disclosure. The example illustrated in FIG. 6F includes obstacles. Based on the field of view 606, during the trajectory from the robot's initial position to the target 640, the robot 604 may observe all of the obstacles 602. When there are obstacles 602 in the robot's field of view 606, the robot cannot see through the obstacle 602. In particular, as shown in FIG. 6G, the obstacle 602a blocks a portion of the robot's field of view 606 such that the robot is unable to view the target 640. That is, a first portion 652 of the field of view 606 is unobstructed and a second portion 650 is obstructed by the obstacle 602a. Thus, because a second portion 650 of the field of view 606 is obstructed, the robot may report the voxel as occupied with some variance or unoccupied with some variance.

Furthermore, for the second portion 650 of the field of view 606 that is unknown to the robot 604, the robot 604 may predict that it will report the voxel corresponding to the field of view 606 as occupied. Still, the robot 604 does not know whether it will be able to see through the obstacle 602a because there might not be an obstacle. That is, the presence of the obstacle 602a was inferred by the robot 604. The inference may be noisy. Thus, the inference may have a certain amount of variance. Therefore, the obstacle 602a may not exist when the robot 604 gets to the voxel with the obstacle 602a. Accordingly, when predicting a trajectory, the robot 604 does not know whether it can see through the obstacle 602a. Determining whether the obstacle 602a may be present is also a function of the variance.

Figure 7:
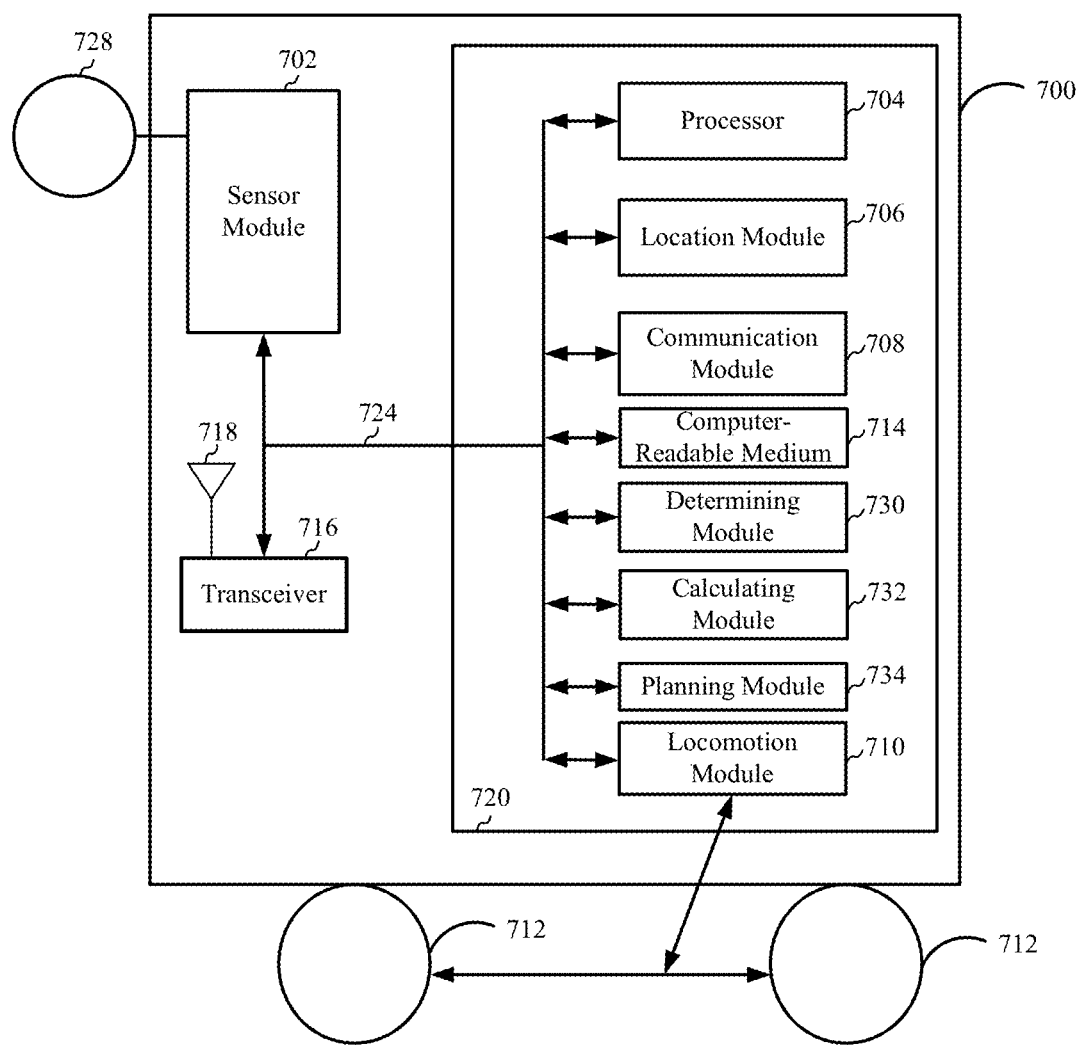
FIG. 7 is a block diagram illustrating different modules/means/components in an exemplary apparatus.

FIG. 7 is a diagram illustrating an example of a hardware implementation for an apparatus 700, such as a robot, employing a processing system 720. The processing system 720 may be implemented with a bus architecture, represented generally by the bus 724. The bus 724 may include any number of interconnecting buses and bridges depending on the specific application of the processing system 720 and the overall design constraints. The bus 724 links together various circuits including one or more processors and/or hardware modules, represented by the processor 704 the communication module 708, location module 706, sensor module 702, locomotion module 710, and the computer-readable medium 714. The bus 724 may also link various other circuits such as timing sources, peripherals, voltage regulators, and power management circuits, which are well known in the art, and therefore, will not be described any further.

The apparatus 700 includes a processing system 720 coupled to a transceiver 716. The transceiver 716 is coupled to one or more antennas 718. The transceiver 716 enables communicating with various other apparatus over a transmission medium. The processing system 720 includes a processor 704 coupled to a computer-readable medium 714. The processor 704 is responsible for general processing, including the execution of software stored on the computer-readable medium 714. The software, when executed by the processor 704, causes the processing system 720 to perform the various functions described for any particular apparatus. The computer-readable medium 714 may also be used for storing data that is manipulated by the processor 704 when executing software.

The sensor module 702 may be used to obtain measurements via a sensor 728. The sensor 728 may be a stereo vision sensor, for performing measurements, such as a stereoscopic camera. Of course, aspects of the present disclosure are not limited to a stereo vision sensor as other types of sensors, such as, for example, radar, thermal, sonar, and/or lasers are also contemplated for performing measurements. The measurements of the sensor 728 may be processed by one or more of the processor 704 the communication module 708, location module 706, locomotion module 710, the computer-readable medium 714, and other modules 730 732 734. Furthermore, the measurements of the sensor 728 may be transmitted to an external device by the transceiver 716. The sensor 728 is not limited to being defined external to the apparatus 700, as shown in FIG. 7, the sensor 728 may also be defined within the apparatus 700.

The location module 706 may be used to determine a location of the apparatus 700. The location module 706 may use GPS or other protocols for determining the location of the apparatus 700. The communication module 708 may use the transceiver 716 to send and receive information, such as the location of the apparatus 700, to an external device. The locomotion module 710 may be used to provide locomotion to the apparatus 700. As an example, locomotion may be provided via wheels 712. Of course, aspects of the present disclosure are not limited to providing locomotion via wheels 712 and are contemplated for any other type of component for providing location.

The processing system 720 includes a determining module 730 for determining a mean of an occupancy level for a location in a map. The determining module may also determine a probability distribution function of the occupancy level. The processing system 720 also includes a calculating module 732 for calculating a cost function based on the probability distribution function. The processing system 720 further includes a planning module 734 for simultaneously planning the path and mapping the environment based on the cost function. The modules may be software modules running in the processor 704, resident/stored in the computer-readable medium 714, one or more hardware modules coupled to the processor 704, or some combination thereof.

Figure 8:
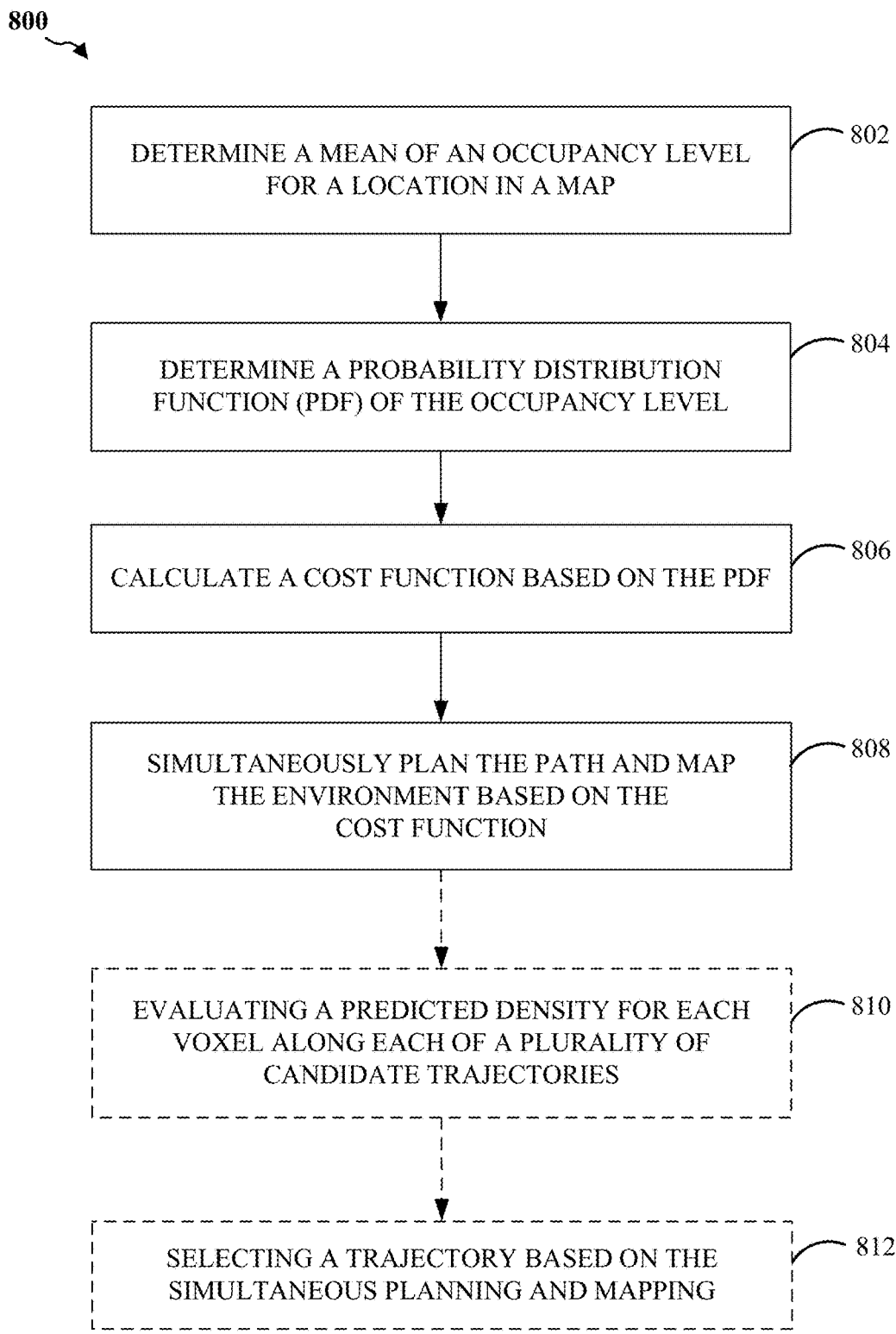
FIG. 8 illustrates a flow diagram for a method for simultaneously planning a path and mapping an environment by a robot according to aspects of the present disclosure.

FIG. 8 illustrates a method 800 for simultaneously planning a path and mapping an environment by a robot. In block 802, a robot determines a mean of an occupancy level for a location in a map. In block 804, the robot determines a probability distribution function (PDF) of the occupancy level.

Additionally, in block 806, the robot calculates a cost function based on the PDF. In some aspects, the cost function may be calculated based on the mean occupancy level and a variance of the occupancy level obtained from the PDF.

Further, in block 808, the robot simultaneously plans the path and maps the environment based on the cost function. In some aspects the environment may be mapped based on the mean occupancy level and the PDF. The path may be planned based on predicted maps.

In some aspects, the robot may optionally evaluate a predicted density for each voxel along each of a plurality of candidate trajectories, in block 810.

Furthermore, in some aspects, the robot may optionally select a trajectory based on the simultaneous planning and mapping, in block 812.

In some aspects, method 800 may be performed by the SOC 100 (FIG. 1) or the system 200 (FIG. 2). That is, each of the elements of method 800 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of substantially simultaneously planning a path and mapping an environment by a robot, comprising:
   determining a mean of an occupancy level for a location in a map;
   determining a probability distribution function (PDF) of the occupancy level;
   calculating a cost function based on the mean occupancy level and a variance of the occupancy level obtained from the PDF; and
   simultaneously planning the path and mapping the environment based on the cost function.

2. The method of claim 1, further comprising mapping the environment based on the mean occupancy level and the PDF.

3. The method of claim 1, in which the simultaneously planning further comprises evaluating a predicted density for each voxel along each of a plurality of candidate trajectories.

4. The method of claim 1, further comprising planning the path based on predicted maps.

5. The method of claim 1, further comprising selecting a trajectory based on the simultaneous planning and mapping.

6. An apparatus for substantially simultaneously planning a path and mapping an environment, the apparatus comprising:

a memory;

at least one processor coupled to the memory, the at least one processor configured:
- to determine a mean of an occupancy level for a location in a map;
- to determine a probability distribution function (PDF) of the occupancy level;
- to calculate a cost function based on the mean occupancy level and a variance of the occupancy level obtained from the PDF; and
- to simultaneously plan the path and map the environment based on the cost function.

7. The apparatus of claim 6, in which the at least one processor is further configured to map the environment based on the mean occupancy level and the PDF.

8. The apparatus of claim 6, in which the at least one processor is further configured to evaluate a predicted density for each voxel along each of a plurality of candidate trajectories.

9. The apparatus of claim 6, in which the at least one processor is further configured to plan the path based on predicted maps.

10. The apparatus of claim 6, in which the at least one processor is further configured to select a trajectory based on the simultaneous planning and mapping.

11. An apparatus for substantially simultaneously planning a path and mapping an environment, the apparatus comprising:
- means for determining a mean of an occupancy level for a location in a map;
- means for determining a probability distribution function (PDF) of the occupancy level;
- means for calculating a cost function based on the mean occupancy level and a variance of the occupancy level obtained from the PDF; and
- means for simultaneously planning the path and mapping the environment based on the cost function.

12. The apparatus of claim 11, further comprising means for mapping the environment based on the mean occupancy level and the PDF.

13. The apparatus of claim 11, further comprising means for evaluating a predicted density for each voxel along each of a plurality of candidate trajectories.

14. The apparatus of claim 11, further comprising means for planning the path based on predicted maps.

15. The apparatus of claim 11, further comprising means for selecting a trajectory based on the simultaneous planning and mapping.

16. A non-transitory computer-readable medium having program code recorded thereon for substantially simultaneously planning a path and mapping an environment for a robot, the program code being executed by a processor and comprising:
- program code to determine a mean of an occupancy level for a location in a map;
- program code to determine a probability distribution function (PDF) of the occupancy level;
- program code to calculate a cost function based on the mean occupancy level and a variance of the occupancy level obtained from the PDF; and
- program code to simultaneously plan the path and map the environment based on the cost function.

17. The non-transitory computer-readable medium of claim 16, in which the program code further comprises program code to map the environment based on the mean occupancy level and the PDF.

18. The non-transitory computer-readable medium of claim 16, in which the program code further comprises program code to evaluate a predicted density for each voxel along each of a plurality of candidate trajectories.

19. The non-transitory computer-readable medium of claim 16, in which the program code further comprises program code to plan the path based on predicted maps.

20. The non-transitory computer-readable medium of claim 16, in which the program code further comprises program code to select a trajectory based on the simultaneous planning and mapping.

* * * * *